United States Patent
Johnson et al.

(10) Patent No.: US 10,277,002 B2
(45) Date of Patent: Apr. 30, 2019

(54) MONOLITHIC INTEGRATED SEED AND HIGH POWER PUMP SOURCE

(71) Applicant: BAE SYSTEMS INFORMATION AND ELECTRONIC SYSTEMS INTEGRATION INC., Nashua, NH (US)

(72) Inventors: Benjamin R. Johnson, Nottingham, NH (US); Casey W. Jones, Rochester, NH (US)

(73) Assignee: BAE Systems Information and Electronic Systems Integrations Inc., Nashua, NH (US)

( * ) Notice: Subject to any disclaimer, the term of this patent is extended or adjusted under 35 U.S.C. 154(b) by 8 days.

(21) Appl. No.: 15/368,866

(22) Filed: Dec. 5, 2016

(65) Prior Publication Data
US 2018/0159296 A1 Jun. 7, 2018

(51) Int. Cl.
| | |
|---|---|
| *H01S 3/094* | (2006.01) |
| *H01S 3/067* | (2006.01) |
| *H01S 3/16* | (2006.01) |
| *H01S 3/0941* | (2006.01) |
| *H01S 3/17* | (2006.01) |

(52) U.S. Cl.
CPC .... *H01S 3/094061* (2013.01); *H01S 3/06758* (2013.01); *H01S 3/09415* (2013.01); *H01S 3/094015* (2013.01); *H01S 3/161* (2013.01); *H01S 3/1616* (2013.01); *H01S 3/176* (2013.01)

(58) Field of Classification Search
CPC ........ H01S 3/091; H01S 3/161; H01S 3/0675; H01S 3/1616; H01S 3/1655
See application file for complete search history.

(56) References Cited

U.S. PATENT DOCUMENTS

| | | | |
|---|---|---|---|
| 7,537,395 B2 | 5/2009 | Savage-Leuchs | |
| 7,738,514 B2 | 6/2010 | Rogers et al. | |
| 2004/0022280 A1 | 2/2004 | Lai et al. | |
| 2004/0057471 A1* | 3/2004 | Shevy | H01S 3/067 372/6 |
| 2011/0211598 A1 | 9/2011 | Liu et al. | |
| 2016/0141828 A1* | 5/2016 | Ahmadi | G02B 6/024 359/337.4 |

OTHER PUBLICATIONS

Wang et al., "100 W-level Tm-doped fiber laser pumped by 1173 nm Raman fiber lasers", Aug. 1, 2014, vol. 39, No. 15, Optics Letters.
Wang et al., "High-power tandem-pumped thulium-doped fiber laser", Feb. 9, 2015, vol. 23, No. 3, Optics Express 2997.

* cited by examiner

*Primary Examiner* — Xinning (Tom) Niu
(74) *Attorney, Agent, or Firm* — David & Bujold, PLLC (57) ABSTRACT

The system and method of integrated seed and high power pump source generates two wavelengths outside the effective gain bandwidth of a single gain medium without using two unique pump sources in a fiber amplifier train. The system and method uses a single pump power oscillator that passes a seed wavelength with no loss and minimal amplification to pump integrated amplifiers in both directions (forward and backward) resulting in amplification of the seed wavelength.

16 Claims, 9 Drawing Sheets

MONOLITHIC INTEGRATED SEED AND HIGH POWER PUMP SOURCE

FIELD OF THE DISCLOSURE

The present disclosure relates to high power lasers and, more particularly, to monolithic, integrated seed and high power pump sources for high power lasers.

BACKGROUND OF THE DISCLOSURE

Typical laser systems that use two gain mediums require pump sources for each medium. Additionally, typical laser systems discard any remaining pump energy that is reflected backward because it is not useful for use in subsequent gain stages. Conventional systems require additional components, greater space requirements, and are less efficient than the system of the present disclosure. Wherefore, it is an object of the present disclosure to overcome the above mentioned shortcomings and drawbacks associated with the conventional art.

SUMMARY OF THE DISCLOSURE

One aspect of the present disclosure is an integrated seed and high power pump source, comprising a pump power oscillator comprising a first medium having a pump wavelength ($\lambda$p), a leaky high reflector fiber Bragg grating (FBG), and a partially reflective FBG, where the pump power oscillator intentionally propagates a minor portion of pump wavelength ($\lambda$p) radiation in the reverse direction through the leaky high reflector fiber Bragg grating (FBG) and propagates a major portion of pump wavelength ($\lambda$p) radiation in the forward direction through the partially reflective FBG; a seed pre-amplifier comprising a second medium having a seed wavelength ($\lambda$s) wherein the seed pre-amplifier is pumped by the reverse propagating pump wavelength ($\lambda$p) radiation leaked backwards through a reflection of the leaky high reflector fiber Bragg grating (FBG); and a seed power amplifier comprising the second medium having the seed wavelength ($\lambda$s) wherein the seed power amplifier is pumped by the forward propagating pump wavelength ($\lambda$p) radiation through the transmission of the partially reflective FBG.

In one embodiment of the integrated seed and high power pump source is wherein the first medium is thulium-doped silica fiber and the second medium is holmium-doped silica fiber. In certain embodiments, the seed wavelength ($\lambda$s) is about 2110 nm and the pump wavelength ($\lambda$p) is about 1920 nm.

In another embodiment of the integrated seed and high power pump source the seed wavelength ($\lambda$s) is outside a practical gain bandwidth of the first medium, but within the emission bandwidth of the first medium. In some cases, the pump wavelength ($\lambda$p) lies in a spectrally overlapped region of the first medium and the second medium, such that there is significant gain in the first medium and significant absorption in the second medium.

In yet another embodiment of the integrated seed and high power pump source the seed pre-amplifier further comprises a seed diode and the pump power oscillator further comprises a pump/signal combiner. In some cases, the pump/signal combiner is pumped by a pump source having a pump source wavelength ($\lambda$p2). In one example, the pump source wavelength ($\lambda$p2) is about 795 nm.

Another aspect of the present disclosure is a method of pumping integrated amplifiers with a single pump source comprising providing a pump power oscillator comprising a first medium having a pump wavelength ($\lambda$p), a leaky high reflector fiber Bragg grating (FBG), and a partially reflective FBG; providing a seed pre-amplifier comprising a second medium having a seed wavelength ($\lambda$s); providing a seed power amplifier comprising the second medium having the seed wavelength ($\lambda$s); propagating pump wavelength ($\lambda$p) radiation from the pump power oscillator, in a forward direction, through the partially reflective FBG; pumping the seed power amplifier with the forward propagating pump wavelength ($\lambda$p) radiation via the transmission of the partially reflective FBG; propagating pump wavelength ($\lambda$p) radiation from the pump power oscillator, in a reverse direction, through the leaky high reflector FBG; and pumping the seed pre-amplifier with the reverse propagating pump wavelength ($\lambda$p) radiation leaked backward via the reflection of the leaky high reflector FBG.

One embodiment of the method of pumping integrated amplifiers with a single pump source is wherein the first medium is thulium-doped silica fiber and the second medium is holmium-doped silica fiber. In one example, the seed wavelength ($\lambda$s) is about 2110 nm and the pump wavelength ($\lambda$p) is about 1920 nm.

Another embodiment of the method of pumping integrated amplifiers with a single pump source is wherein the seed wavelength ($\lambda$s) is outside a practical gain bandwidth of the first medium, but within the emission bandwidth of the first medium. In some cases, the pump wavelength ($\lambda$p) lies in a spectrally overlapped region of the first medium and the second medium, such that there is significant gain in the first medium and significant absorption in the second medium.

In another example of the method of pumping integrated amplifiers with a single pump source the seed pre-amplifier further comprises a seed diode and the pump power oscillator further comprises a pump signal combiner that is pumped by a pump source having a pump source wavelength ($\lambda$p2). In yet another embodiment of the method, the pump source wavelength ($\lambda$p2) is about 795 nm.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

The system of the present disclosure is a compact, robust method for combining and amplifying a dual wavelength source in a monolithic fiber amplifier. The system exploits the absorption and emission properties of two rare earth element doped fibers operating at similar wavelengths where a seed wavelength experiences modest gain (and minute absorption) in a first doped medium and a pump wavelength experiences significant gain in the first doped medium and significant absorption in a second medium. Additionally, the seed wavelength experiences significant gain in the second medium when pumped by the pump wavelength. This configuration allows for the generation of multiple wavelengths outside the effective gain region of a single medium, within a single gain aperture, without explicitly pumping two different lasers with two separate pump sources.

The need for the system of the present disclosure stems from the continuous drive to minimize laser complexity, reduce package volume and weight, and increase overall system efficiency. The present disclosure addresses these needs by exploiting the differences and commonalities of resonantly-pumped laser architectures.

Figure 1A:
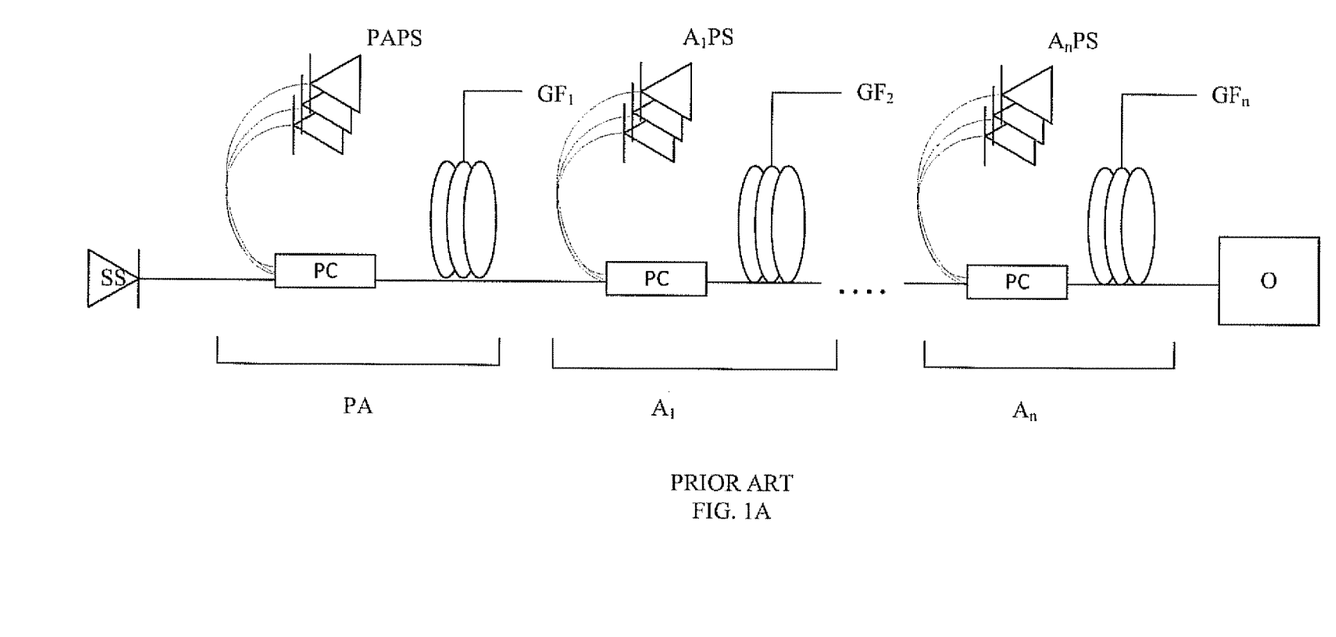
FIG. 1A is a schematic of a conventional solid state laser power scaling system.

Referring to FIG. 1A, a schematic of a conventional solid state laser power scaling system is shown. There, a seed source (SS) is shown feeding a pre-amplifier (PA), which is pumped by a separate pre-amplifier pump source (PAPS). The seed source (SS) can be a diode laser, a fiber laser, a solid state laser, or the like. The pre-amplifier pump source is feed into a pump combiner (PC) and through a first gain fiber ($GF_1$) within the pre-amplifier (PA). The signal is then fed into a first amplifier ($A_1$). The first amplifier also has a unique pump source ($A_1PS$) that is fed through a pump combiner (PC) and into a separate second gain fiber ($GF_2$). There may be a series of other amplifiers in this train, culminating at a final amplifier ($A_n$). The final amplifier in the series ($A_n$) has a unique pump source ($A_nPS$) that is fed through a pump combiner (PC) and an $n^{th}$ gain fiber ($GF_n$) resulting in an output signal (O).

Figure 1B:
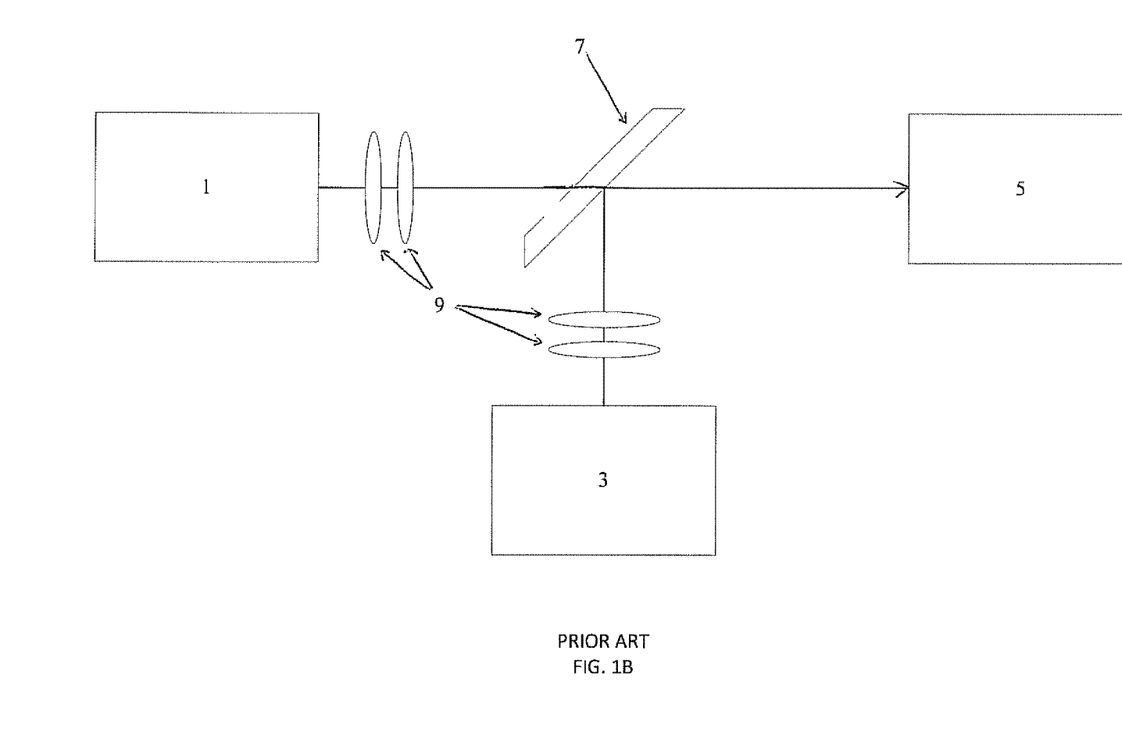
FIG. 1B is a diagram of conventional solid state laser power scaling system.

Referring to FIG. 1B, a diagram of a conventional solid state laser power scaling system is shown. There, a solid state laser 5 is pumped by a solid state laser pump source 3 at a first wavelength and as well as a fiber amplifier train 1 at a second wavelength. One example would be Ho:YAG, which readily provides gain at 2090 nm and is pumped at 1908 nm. Here, one needs to combine the beams from an explicit pump source (1) and an explicit seed source (3) into the solid state laser (5). This requires extra optics (7, 9) and results in excess loss and cost. The conventional system can result in performance deficiencies due to poor matching of signal and pump beam dimensions and increases the physical size of the solid state laser.

In contrast, the system of the present disclosure simultaneously provides both pump and signal wavelengths out of the same aperture with the same beam prescriptions allowing for fewer optics and higher performance. See, for example, FIG. 2A and FIG. 2B. One example of the system herein is for resonantly pumped systems using two gain mediums whose emission and absorption overlap, but that are decoupled such that any performance sacrificing effects such as feedback and coupled cavity issues are not an issue as they would be in a dual wavelength system that utilizes a single gain medium.

One example of the system described herein uses the rare earth element dopants thulium and holmium in silica fibers. This system applies to any system sharing the above-referenced gain and absorption characteristics used to generate, transmit, and amplify two or more wavelengths. Another arrangement similar to the first example utilizes ytterbium (in place of thulium) and holmium where 1 um is the pump wavelength and 2.1 um is the seed wavelength.

Figure 2A:
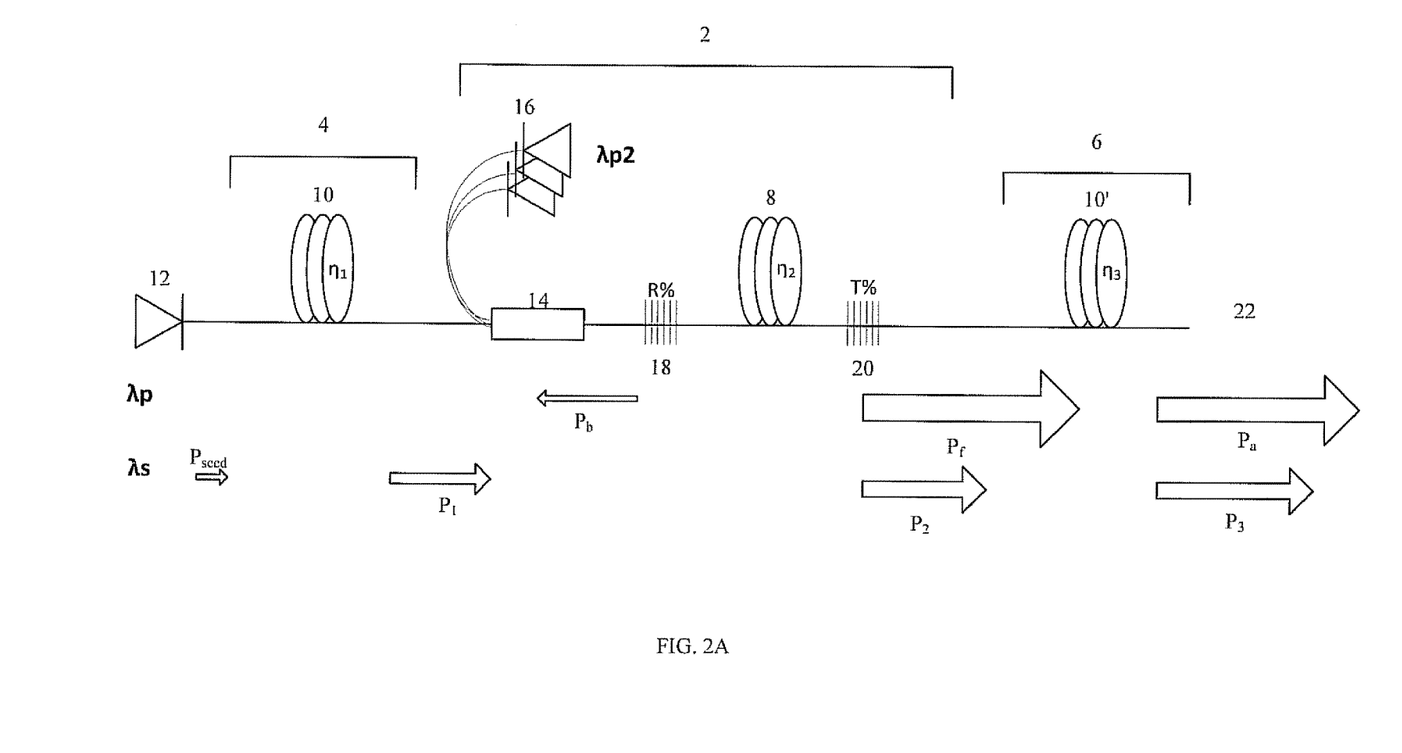
FIG. 2A is a schematic of one embodiment of the integrated seed and high power pump source of the present disclosure.

Referring to FIG. 2A, a schematic of one embodiment of the integrated seed and high power pump source of the present disclosure is shown. In one example, there are three main components to the system; a pump power oscillator 2, a seed pre-amplifier 4, and a seed power amplifier 6.

The pump power oscillator 2 in one example comprises a first medium 8 with a pump wavelength ($\lambda p$), a leaky high reflector fiber Bragg grating (leaky HR FBG) 18, and a partially reflective fiber Bragg grating (PR FBG) 20. The first medium 8 is pumped by a series of pump diodes 16 at a pump source wavelength ($\lambda p2$). The seed pre-amplifier 4 comprises a second medium 10 with a seed wavelength ($\lambda s$) and in some cases also comprises a seed diode 12 or other seed source. The seed power amplifier 6 comprises the second medium 10' with the seed wavelength ($\lambda s$).

The pump power oscillator 2 comprises a first medium 8 that is pumped by a series of pump diodes 16 at a pump source wavelength ($\lambda p2$). In certain embodiments, the pump source wavelength ($\lambda p2$) is about 795 nm and generates radiation at the pump wavelength $\lambda p$ (e.g., 1920 nm). The pump diodes 16 provide radiation that passes through the pump/signal combiner 14, through the leaky high reflector FBG 18, the first medium 8, and the partially reflective FBG 20. In one embodiment, the first medium 8 is a thulium doped silica fiber (Tm:Silica). The pump power oscillator 2 is predominantly output-coupled in the forward direction according to the ratio of the reflectance/transmission of the leaky high reflector FBG 18 to the partially reflective FBG 20. A major portion of the pump wavelength ($\lambda p$) radiation from the pump power oscillator 2 propagates in the forward direction through the partially reflective FBG 20 (as represented by the power $P_f$ in FIG. 2A) and feeds the seed power amplifier 6, while a minor portion of the pump wavelength ($\lambda p$) radiation from the pump power oscillator 2 propagates in the backward direction through the leaky high reflector FBG 18 (as represented by the power $P_b$ in FIG. 2A) and feeds the seed pre-amplifier 4. $P_b$ is the wavelength that the pre-amplifier absorbs (e.g., 1908 nm). This absorbed energy is then extracted from the pre-amplifier doped fiber by the seed signal (e.g., 2090 nm) resulting in gain at the seed wavelength as it exits the pre-amplifier. The pre-amplifier converts the pump energy to signal energy. This is a typical laser process. $P_b$ is the pump for the seed pre-amplifier. The leaky high reflector FBG intentionally allows power to flow backwards to pump the pre-amplifier. Without the leaky high reflector, the pre-amplifier would need its own unique pump source.

The seed diode 12 in one embodiment provides additional laser radiation with power $P_{seed}$ at a seed wavelength ($\lambda s$) that is coupled to a section of holmium doped fiber (Ho:Silica) 10 and acts as a seed pre-amplifier 4. The seed diode 12 can operate in continuous-wave, pulsed, or a hybrid mode. In certain embodiments, the seed wavelength ($\lambda s$) is about 2110 nm. The seed pre-amplifier of the present disclosure is not limited to the use of a seed diode. In some embodiments, the seed diode can be replaced with a laser. Some possible lasers include, but are not limited to monolithic, FBG-based fiber oscillators, tunable fiber lasers, free-space hybrid fiber lasers, solid state lasers, gas lasers, chemical lasers, light emitting diodes, and the like.

As can be seen in FIG. 2A, the seed pre-amplifier 4 is also pumped by the reverse propagating pump wavelength ($\lambda p$) radiation ($P_b$) generated in the pump power oscillator 2. The reverse propagating pump power at a pump wavelength $\lambda p$ (e.g., about 1920) is leaked backward using the reflection of a leaky high reflector fiber Bragg grating (FBG).

In certain embodiments of the present disclosure, the seed wavelength ($\lambda s$) passes through the pump/signal combiner 14 into the pump power oscillator 2 where minimal gain is experienced. The pump power oscillator 2 is pumped by a pump source 16 having a pump source wavelength ($\lambda p2$) as discussed above. In one example, the pump source wavelength ($\lambda p2$) is about 795 nm and generates radiation at the pump wavelength $\lambda p$ (e.g., 1920 nm). This is predominantly output-coupled in the forward direction according to the ratio of the reflectance/transmission of the leaky high reflector FBG 18 and the partially reflective FBG 20 that compose the two feedback devices for the pump power oscillator 2.

At this point the seed and pump wavelengths are propagating collinearly in the core of the thulium fiber (i.e., the first medium). Both signals are coupled to the seed power amplifier 6 where the pump wavelength $\lambda p$ (e.g., 1920 nm) is absorbed and converted to the seed wavelength $\lambda s$ (e.g., 2110 nm) via excitation and emission within the holmium silica fiber (Ho:Silica) 10'. The output of the seed power amplifier is then terminated and both wavelengths (e.g., a seed wavelength ($\lambda s$) of about 2110 nm and a pump wavelength ($\lambda p$) of about 1920 nm) are emitted at the fiber output 22 with nearly identical beam propagation properties due to the absolute close proximity of each other in spectral space, common fiber exit criteria, and general Gaussian beam propagation. Some common fiber exit criteria include the core size, mode-field diameter, numerical aperture, and the like.

The relative powers attributed to the radiation at the pump wavelength ($\lambda p$) throughout the fiber train are represented in a relative manner by the scale and direction of the top layer of arrows shown in FIG. 2A. More specifically, the first arrow in the top layer moving from left to right across FIG. 2A is designated as $P_b$. This is the pump power leaked backward from the leaky high reflector FBG 18. Next, is the pump power at the pump wavelength ($\lambda p$) that the pump power oscillator 2 is propagating in the forward direction, $P_f$. The ratio of $P_f:P_b$ is determined by the ratio of partial reflective FBG and leaky high reflector FBG reflectivity, i.e., $P_b$ is inversely and non-linearly related to the reflectivity of the leaky high reflector FBG. The final arrow attributed to the radiation at the pump wavelength ($\lambda p$) is the residual pump power, $P_a$, from the seed power amplifier 6.

The relative powers attributed to the radiation at the seed wavelength ($\lambda s$) throughout the fiber train are represented in a relative manner by the scale and direction of the lower layer of arrows as seen in FIG. 2A. More specifically, the first arrow in the lower layer moving from left to right across FIG. 2A is designated as $P_{seed}$. This is the power from the seed diode 12, or other seed source. Next, is $P_1$, the seed power after experiencing gain in the seed pre-amplifier 4. Next, is $P_2$, the seed power experiences gain in the forward direction through the pump power oscillator 2. Lastly, the seed power output from the seed power amplifier 6 after experiencing gain is designated as $P_3$. Here, $\eta_1$, $\eta_2$ and $\eta_3$ represent oscillator and amplifier efficiencies and can range from about 20-90% based upon the gain saturation characteristic of each laser. The system of the present disclosure thus provides generation, amplification, and transmission of two different wavelengths (i.e., a seed wavelength and a pump wavelength) within a single fiber laser.

Figure 2B:
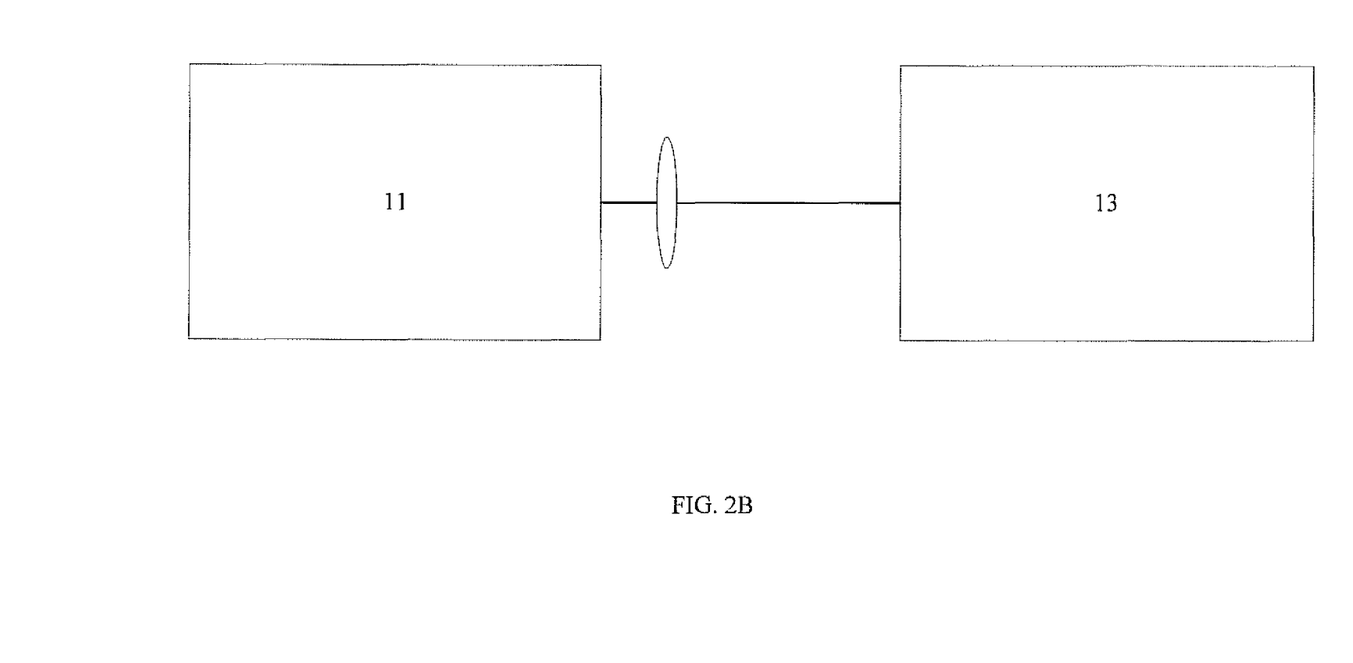
FIG. 2B is a diagram of one embodiment of the integrated seed and high power pump source of the present disclosure.

FIG. 2B demonstrates one embodiment of the system addressing the generation, amplification, and transmission of two different wavelengths within a single fiber laser in diagrammatic form. In FIG. 2B, fewer optics are needed to combine the seed and pump power 11 into a solid state laser 13 than in conventional systems due to the fact that both wavelengths (seed and pump) exit from the same aperture with the same beam properties. In one example, Ho:YAG is used and the monolithic seed and pump source 11 has a seed wavelength of about 2090 nm and a pump wavelength of about 1908 nm.

Figure 3:
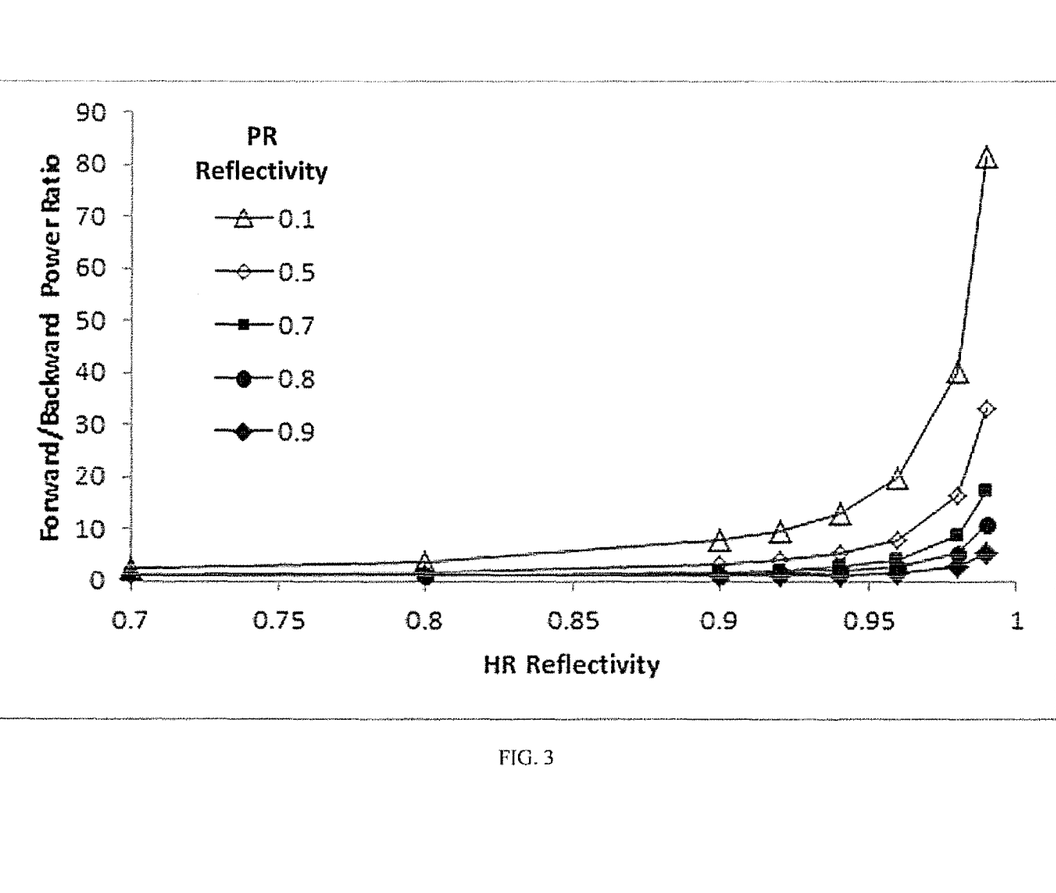
FIG. 3 is a plot of various partially reflective fiber Bragg gratings and high reflector fiber Bragg gratings yielding various forward/backward power ratios.

Referring to FIG. 3, plots of different reflectivities for the partially reflective FBG and the leaky high reflector FBG result in a range of power ratios. The fraction of power at the pump wavelength ($\lambda p$) that is leaked in the backward direction from the pump power oscillator 2 is proportional to the factor (I-R) where R is the reflectivity of the leaky high reflector FBG. For example, a 100 W pump power oscillator with a 95% reflective high reflector FBG and a 10% partially reflective FBG will leak roughly 5 W in the backward direction. This relationship is readily calculated and has been experimentally verified.

In some embodiments, the leaky high reflector FBG will leak about 5% to about 50% with the exact amount determined by gain saturation characteristics of the seed pre-amplifier 4. The amount of power at the pump wavelength ($\lambda p$) used to pump the seed pre-amplifier 4 depends on the total output power needed for amplifier saturation in the seed power amplifier 6. The system takes into account the minimal gain experienced in the pump power oscillator 2 and the seed provided to the seed pre-amplifier 4.

One embodiment of the present disclosure uses a seed source with a seed wavelength ($\lambda s$) that is outside the practical gain bandwidth of a first medium 8. Here, the seed wavelength ($\lambda s$) is equal to 2110 nm and the first medium 8 is thulium-doped silica (Tm:Silica). Though 2110 nm is within the emission bandwidth of Tm, the gain is extremely low; it is not practical to use Tm:Silica as a gain medium for 2110 nm for applications requiring high-efficiency amplification to high-power levels.

The pump wavelength ($\lambda p$) is generated in the first medium 8, Tm:Silica, and lies in the spectrally overlapped region of the first medium 8 and a second medium 10, 10', such that there is significant gain in the first medium 8 and significant absorption in the second medium 10, 10'. Here, the pump wavelength ($\lambda p$) is about 1920 nm and the second medium is holmium-doped silica (Ho:Silica) 10, 10'.

Figure 4:
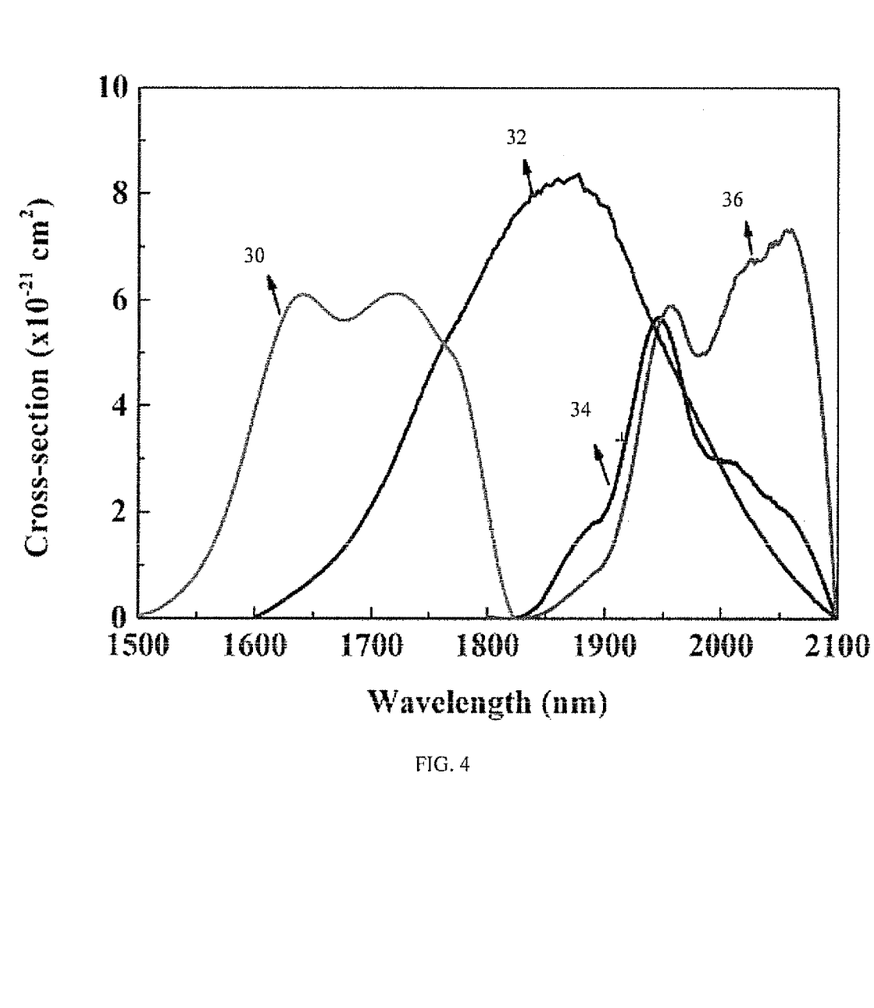
FIG. 4 is a plot of thulium absorption and emission and holmium absorption and emission cross sections in doped glass crystals.

Referring to FIG. 4, a plot of thulium absorption and emission and holmium absorption and emission cross sections in doped glass crystals are shown. More specifically, the thulium absorption cross section is denoted by 30, and the thulium emission cross section is denoted by 32. It is possible to see the spectral overlap with holmium in FIG. 4.

More particularly, the holmium absorption cross section is denoted by 34, and the holmium emission cross section is denoted by 36.

In certain embodiments of the present disclosure, the pump wavelength ($\lambda p$) ranges from about 1800 nm to about 2050 nm. In certain embodiments of the present disclosure, the seed wavelength ($\lambda s$) ranges from about 1940 nm to about 2200 nm. In certain embodiments of the present disclosure, the pump source wavelength ($\lambda p2$) ranges from about 780 nm to about 800 nm.

As described herein, "fiber laser" is a monolithic fiber train with one explicit external pump source from a non-fiber source. The system of the present disclosure uses only one "pump" as seen for example in FIG. 2A. The system is essentially a hybrid fiber laser and amplifier that can do the job of a conventional laser much more efficiently and with fewer space and equipment constraints. For example, compare FIG. 1B and FIG. 2B.

Figure 5:
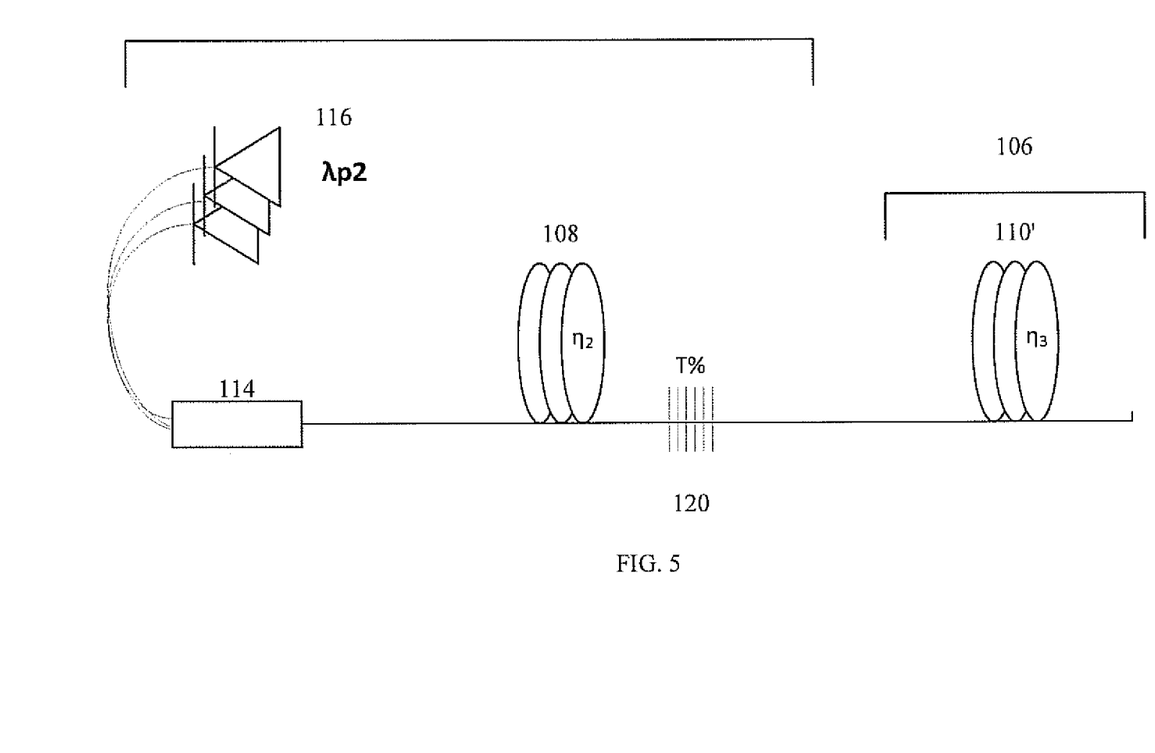
FIG. 5 shows an embodiment of the integrated seed and high power pump source of the present disclosure.

There are many variations in laser architecture that may be used to exploit the described characteristics. The system design depends on the signal levels desired at the output aperture of the laser. In one such example, the seed diode that provides the initial radiation may be a laser of any architecture generating a desired wavelength. In other examples, the seed pre-amplifier may not be necessary. See, for example, FIG. 5. There, a pump power oscillator 102 comprises a first medium 108 that is pumped by a series of pump diodes 116 at a pump source wavelength ($\lambda p2$). In certain embodiments, the pump source wavelength ($\lambda p2$) is about 795 nm and generates radiation at the pump wavelength $\lambda p$ (e.g., 1920 nm). The pump diodes 116 provide radiation that passes through the pump/signal combiner 114, the first medium 108, and the partially reflective FBG 120. Without the seed pre-amplifier, there is no need for a leaky high reflector FBG, but there is still a partially reflective FBG in this case. The first medium 8 is a thulium doped silica fiber (Tm:Silica) in this example. Radiation from the pump power oscillator 102 propagates radiation at the pump wavelength ($\lambda p$) in the forward direction through the partially reflective FBG 120 and feeds the seed power amplifier 106 having a second medium 110' (Ho:Silica). The output of the seed power amplifier is then terminated and both wavelengths (e.g., a seed wavelength ($\lambda s$) of about 2110 nm and a pump wavelength ($\lambda p$) of about 1920 nm) are emitted with nearly identical beam propagation properties as described above.

Figure 6:
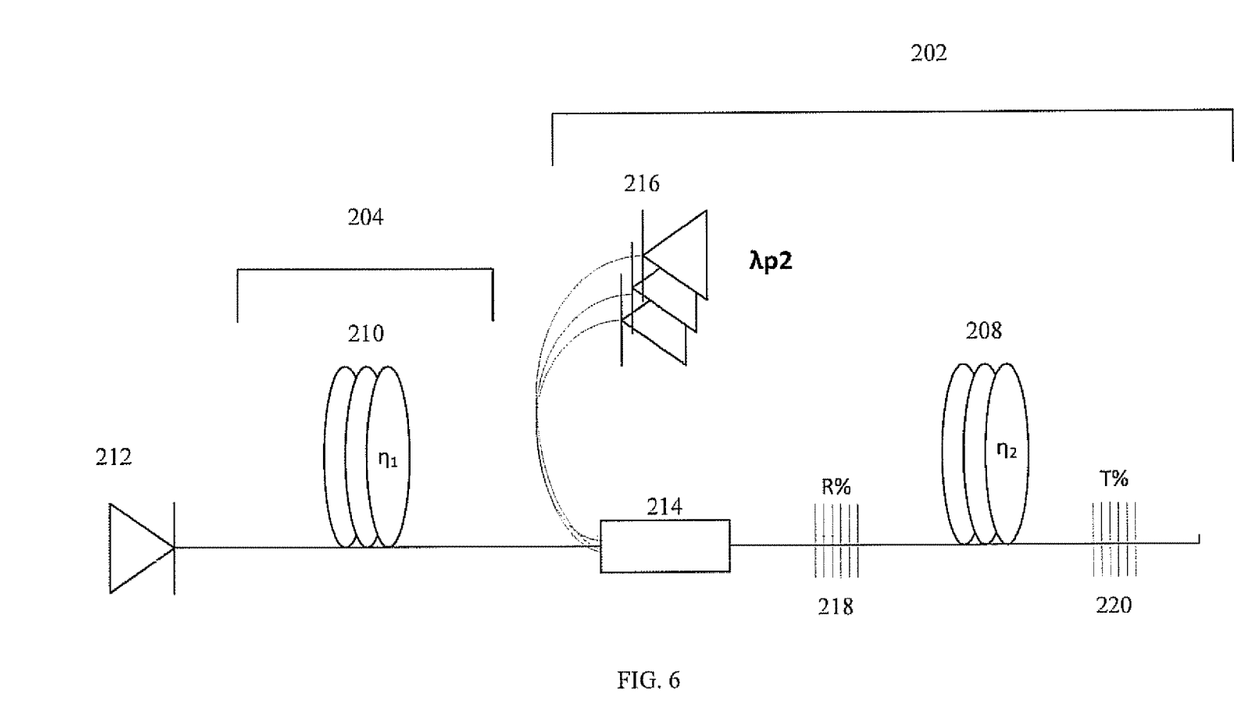
FIG. 6 shows an embodiment of the integrated seed and high power pump source of the present disclosure.

Alternately, the seed power amplifier may not be necessary. See, for example, FIG. 6. There, a seed source 212 provides laser radiation at a seed wavelength ($\lambda s$) that is coupled to a section of holmium doped fiber (Ho:Silica) 210 and acts as a seed pre-amplifier 204. The seed wavelength ($\lambda s$) passes through the pump/signal combiner 214 into the pump power oscillator 202 where minimal gain is experienced. The pump power oscillator 202 is pumped by a pump source 216 having a pump source wavelength ($\lambda p2$) as discussed above. The seed pre-amplifier 204 is also pumped by the reverse propagating pump wavelength ($\lambda p$) radiation generated in the pump power oscillator 202. The reverse propagating pump power at a pump wavelength $\lambda p$ (e.g., about 1920) is leaked backward using the reflection of a leaky high reflector fiber Bragg grating (FBG) 218. At this point the seed and pump wavelengths are propagating collinearly in the core of the thulium fiber (i.e., the first medium) 208. The output is then terminated and both wavelengths (e.g., a seed wavelength ($\lambda s$) of about 2110 nm and a pump wavelength ($\lambda p$) of about 1920 nm) are emitted at the fiber output with nearly identical beam propagation properties due to the absolute close proximity of each other in spectral space, common fiber exit criteria, and general Gaussian beam propagation.

In some embodiments, the pump source for the pump power oscillator may be a fiber laser instead of diodes so long as it generates wavelengths that are efficiently absorbed by the second medium (e.g., Tm:Silica). For example, it is common to pump Tm:Silica in the 1500 nm region with an erbium silica fiber laser. It has also been demonstrated that Tm:Silica can be optically pumped in the 1100 nm region using a Raman-shifted ytterbium-doped fiber laser. It has been further shown that Tm:Silica can be pumped by another Tm:Silica fiber laser operating at a wavelength slightly shorter than the wavelength generated in the pump power oscillator. For example, a pump power oscillator 2 operating at a pump wavelength ($\lambda p$) of about 1940 nm, is still highly absorbed by Ho:Silica, and can be pumped with a 1908 nm Tm:Silica fiber laser. Further, this disclosure considers all optical pump sources generating radiation at the above mentioned wavelengths (e.g., ~1500 nm, ~1100, nm, ~1900 nm, ~800 nm, and the like) regardless of the generation mechanism.

One application of the system of this disclosure is to use the system as an integrated seed and pump source to injection seed a solid-state laser. The system disclosed herein decreases the complexity of a laser system when coupling both pump power and seed power into an oscillator. One can use a common set of optics to couple both the seed and the pump power into the solid state cavity as they are both emitted from the same aperture and demonstrate nearly identical Gaussian beam propagation properties. Properties such as polarization (or the lack thereof) can also be exploited to manipulate the coupling dynamics between the integrated seed/pump source and the solid-state laser to be pumped.

Another application exploiting the common-aperture aspect for the disclosure is a solid-state amplifier. Using the system of the present disclosure, one may place a solid state crystal immediately at the output of the laser, resulting in a very compact architecture due to the absence of beam steering/manipulating optics. For example, a seed wavelength ($\lambda s$) of about 2090 nm and a pump wavelength ($\lambda p$) of about 1933 nm can be generated using the principles of the present disclosure. Then, they can be coupled to holmium yttrium-aluminum garnet (Ho:YAG) amplifiers. Minimal beam coupling optics may be used to condition the beams for the intensities required to achieve efficient laser/amplifier operation.

The system of the present disclosure is especially useful for systems requiring peak or average power levels or spectral and/or brightness requirements that cannot be satisfied by fiber alone due to practical limitations or physics-based limitations such as detrimental fiber non-linearities. Some of these fiber non-linearities include stimulated Raman scattering, stimulated Brillouin scattering, four-wave mixing, cross-phase modulation, and the like.

The exploitation of a single pump power oscillator to pump integrated amplifiers in both directions (forward and backward) while passing the seed wavelength ($\lambda s$) through the fiber train with virtually no loss and minimal amplification is distinctive. The pump wavelength ($\lambda p$) can be exploited for pumping various laser mediums internal and external to the fiber laser.

The system of the present disclosure is also unique in the fact that the system does not use two non-sensitized fibers (for simplicity and practicality) to perform amplification/generation based upon the energy provided by a single pump source having a pump source wavelength (e.g. $\lambda p2$). Here, the system generates two wavelengths outside the effective gain bandwidth of a single gain medium without using separate pump sources for each sensitized fiber. The seed pre-amplifier and the seed power amplifier do not have explicit pump sources pumped by an external pump source like a second fiber laser coupled into the fiber train as would be the case in conventional systems.

The system of the present disclosure provides a simple, highly integrated dual wavelength seed and pump source that is pumped by a single pump source. By using a leaky power oscillator to intentionally distribute pump wavelength radiation in both directions, the system amplifies a seed wavelength in a secondary doped medium without explicitly pumping that gain medium with a secondary external source. The system requires only one external pump source to excite two gain mediums. Typical lasers that use two gain mediums require pump sources for each medium.

Figure 7:
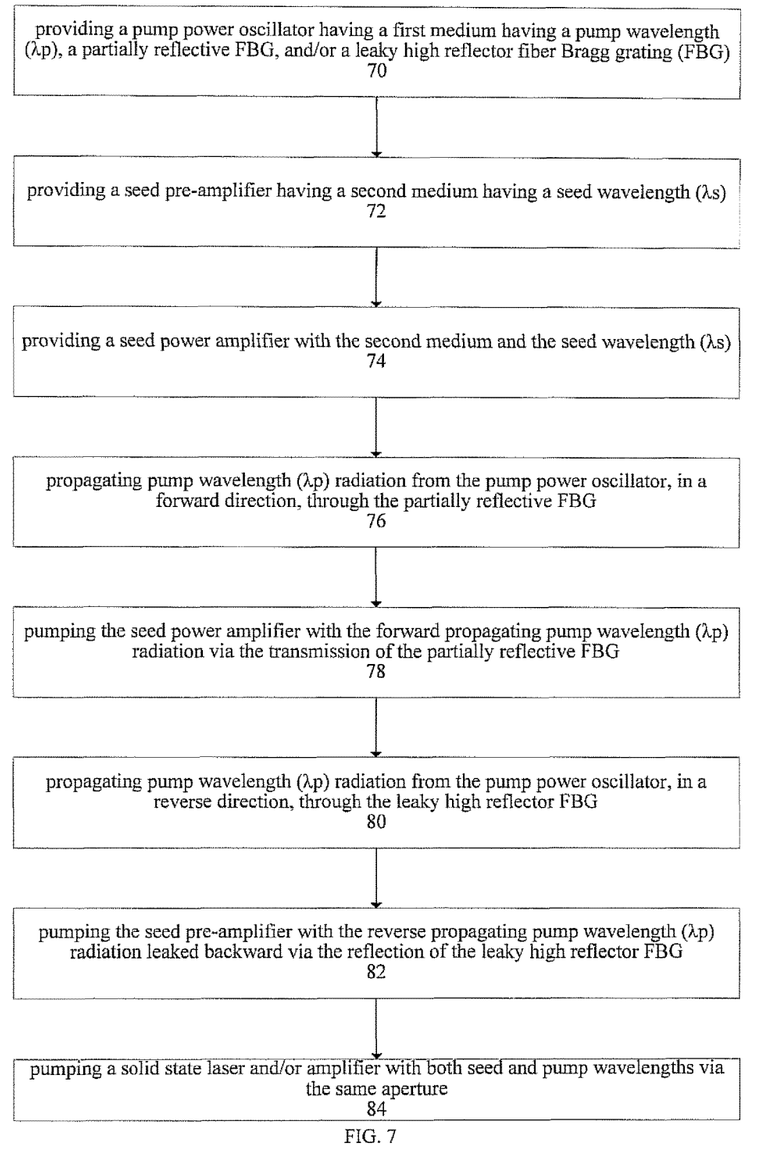
FIG. 7 is a flowchart of shows one embodiment of a method of laser power scaling according to the principles of the present disclosure.

Referring to FIG. 7, a flowchart of one embodiment of the method of the present disclosure is shown. There, one embodiment of the method of pumping integrated amplifiers with a single pump source comprises providing a pump power oscillator having a first medium having a pump wavelength ($\lambda p$), a leaky high reflector fiber Bragg grating (FBG), and a partially reflective FBG 70. The method may also include providing a seed pre-amplifier comprising a second medium having a seed wavelength ($\lambda s$) 72. In some cases, the method also includes providing a seed power amplifier comprising the second medium having the seed wavelength ($\lambda s$) 74. In some embodiments, the pump power oscillator, the seed pre-amplifier and the seed power amplifier are provided. There, propagating radiation from the pump power oscillator at the pump wavelength ($\lambda p$), in a forward direction, through the partially reflective FBG 76 pumps the seed power amplifier with the forward propagating laser radiation via the transmission of the partially reflective FBG 78. Where, propagating radiation from the pump power oscillator at the pump wavelength ($\lambda p$), in a reverse direction, through the leaky high reflector FBG 80 pumps the seed pre-amplifier with the reverse propagating laser radiation leaked backward via the reflection of the leaky high reflector FBG 82. The method is used to pump a solid state laser or amplifier with both the seed and the pump wavelengths via the same aperture 84.

The system of the present disclosure has many applications. Two prominent applications of the system of the present disclosure are medical therapy lasers prone to damage due to high peak powers, and remotely-coupled nonlinear converters where the peak powers required are too high for transmission in appreciable lengths of fiber. Another application is for Lidar/Ladar applications requiring compact, efficient, and portable sources.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An integrated seed and high power pump source, comprising:
    a pump power oscillator comprising a first medium having a pump wavelength ($\lambda p$), a leaky high reflector fiber Bragg grating (FBG), and a partially reflective (PR) FBG, where the pump power oscillator intentionally propagates a minor portion of pump wavelength ($\lambda p$) radiation in the reverse direction through the leaky high reflector fiber Bragg grating (FBG) and propagates a major portion of pump wavelength ($\lambda p$) radiation in the forward direction through the partially reflective FBG;
    the first medium having a gain bandwidth and an emission bandwidth, wherein the gain bandwidth is the width of the optical frequency range in which significant gain is available from an amplifier;
    a seed pre-amplifier comprising a second medium having a seed wavelength ($\lambda s$) wherein the seed pre-amplifier is pumped by the reverse propagating pump wavelength ($\lambda p$) radiation leaked backwards through a reflection of the leaky high reflector fiber Bragg grating (FBG); and
    a seed power amplifier comprising the second medium having the seed wavelength ($\lambda s$) wherein the seed power amplifier is pumped by the forward propagating pump wavelength ($\lambda p$) radiation through the transmission of the partially reflective FBG,
    wherein the seed wavelength ($\lambda s$) is outside the gain bandwidth of the first medium, but within the emission bandwidth of the first medium, and the seed wavelength ($\lambda s$) when pumped by the pump wavelength ($\lambda p$) experiences gain in the second medium; and
    the pump wavelength ($\lambda p$) lies in a spectrally overlapped region of the first medium and the second medium, such that there is gain in the first medium and absorption in the second medium; thereby combining and amplifying a dual wavelength source in a monolithic fiber amplifier.

2. The integrated seed and high power pump source of claim 1, wherein the first medium is thulium-doped silica fiber.

3. The integrated seed and high power pump source of claim 2, wherein the seed wavelength ($\lambda s$) is about 2110 nm.

4. The integrated seed and high power pump source of claim 1, wherein the second medium is holmium-doped silica fiber.

5. The integrated seed and high power pump source of claim 4, wherein the pump wavelength ($\lambda p$) is about 1920 nm.

6. The integrated seed and high power pump source of claim 1, wherein the seed pre-amplifier further comprises a seed diode.

7. The integrated seed and high power pump source of claim 1, wherein the pump power oscillator further comprises a pump/signal combiner.

8. The integrated seed and high power pump source of claim 7, wherein the pump/signal combiner is pumped by a pump source having a pump source wavelength ($\lambda p2$).

9. The integrated seed and high power pump source of claim 8, wherein the pump source wavelength ($\lambda p2$) is about 795 nm.

10. A method of pumping integrated amplifiers with a single pump source comprising:
    providing a pump power oscillator comprising a first medium having a pump wavelength ($\lambda p$), a leaky high reflector fiber Bragg grating (FBG), and a partially reflective FBG;
    providing a seed pre-amplifier comprising a second medium having a seed wavelength ($\lambda s$);
    providing a seed power amplifier comprising the second medium having the seed wavelength ($\lambda s$);

propagating pump wavelength ($\lambda$p) radiation from the pump power oscillator, In a forward direction, through the partially reflective FBG;

pumping the seed power amplifier with the forward propagating pump wavelength ($\lambda$p) radiation via the transmission of the partially reflective FBG;

propagating pump wavelength ($\lambda$p) radiation from the pump power oscillator, in a reverse direction, through the leaky high reflector FBG; and pumping the seed pre-amplifier with the reverse propagating pump wavelength ($\lambda$p) radiation leaked backward via the reflection of the leaky high reflector FBG, wherein the seed wavelength ($\lambda$s) is outside a practical gain bandwidth of the first medium, but within an emission bandwidth of the first medium, wherein being outside the practical gain bandwidth is where the gain is extremely low, so it is not to practical to use for applications requiring high-efficiency amplification, and the seed wavelength {$\lambda$s}, when pumped by the pump wavelength ($\lambda$p), experiences gain in the second medium, and the pump wavelength ($\lambda$p) lies in a spectrally overlapped region of the first medium and the second medium, such that there is gain in the first medium and absorption in the second medium, thereby combining and amplifying a dual wavelength source in a monolithic fiber amplifier.

11. The method of pumping integrated amplifiers with a single pump source of claim 10, wherein the first medium is thulium-doped silica fiber.

12. The method of pumping integrated amplifiers with a single pump source of claim 10, wherein the second medium is holmium-doped silica fiber.

13. The method of pumping integrated amplifiers with a single pump source of claim 10, wherein the seed wavelength ($\lambda$s) is about 2110 nm and the pump wavelength ($\lambda$p) is about 1920 nm.

14. The method of pumping integrated amplifiers with a single pump source of claim 10, wherein the seed pre-amplifier further comprises a seed diode.

15. The method of pumping integrated amplifiers with a single pump source of claim 10, wherein the pump power oscillator further comprises a pump signal combiner and is pumped by a pump source having a pump source wavelength ($\lambda$p2).

16. The method of pumping integrated amplifiers with a single pump source of claim 10, wherein the pump source wavelength ($\lambda$p2) is about 795 nm.

* * * * *